United States Patent [19]

Proudfoot

[11] 3,882,283

[45] May 6, 1975

[54] METHOD AND APPARATUS FOR DETECTING THE PRESENCE OF SIGNAL COMPONENTS OF PREDETERMINED FREQUENCY IN A MULTI-FREQUENCY SIGNAL

[75] Inventor: Alexander David Proudfoot, Oxford, England

[73] Assignee: The Commonwealth of Australia, Melbourne, Australia

[22] Filed: Aug. 13, 1973

[21] Appl. No.: 387,855

[30] Foreign Application Priority Data

Aug. 10, 1972 Australia ................................ 24/72

[52] U.S. Cl. ................................ 179/84 VF; 328/138

[51] Int. Cl. ................................ H04m 1/50

[58] Field of Search .......... 179/84 VF; 343/100 CL; 340/171 R; 328/117, 138

[56] References Cited

UNITED STATES PATENTS

| | | | |
|---|---|---|---|
| 3,412,334 | 11/1968 | Whitaker | 325/325 |
| 3,502,989 | 3/1970 | Honeiser | 325/476 |
| 3,636,446 | 1/1972 | Genter et al. | 324/78 F |
| 3,652,805 | 3/1972 | Wisner | 179/84 VF |

*Primary Examiner*—Kathleen H. Claffy
*Assistant Examiner*—Joseph Popek

[57] ABSTRACT

A method and apparatus for detecting the presence or otherwise of a particular frequency component in a pulse coded multi-frequency signal in which ones of the pulse sequence representing the signal are multiplied separately by ones of two pulse sequences representing the frequency of said particular frequency component for two relative phase displacements other than 0 and $n\pi (n=1,2,3 \ldots)$, summing the two sets of multiplicands so obtained and comparing at least the greater sum so derived, or functions of these sums with a reference value.

17 Claims, 4 Drawing Figures

PATENTED MAY 6 1975 3,882,283

SHEET 02 OF 2

METHOD AND APPARATUS FOR DETECTING THE PRESENCE OF SIGNAL COMPONENTS OF PREDETERMINED FREQUENCY IN A MULTI-FREQUENCY SIGNAL

This invention relates to a method and apparatus for detecting the presence of signal components of predetermined frequency in a signal.

Certain communications systems utilise multifrequency signals to identify particular desired switching conditions in the system. For example in one form of telephone network, identification by a telephone user of a telephone hand-set which it is desired to contact is effected by the user pressing, in sequence, appropriate ones of a set of buttons on his hand-set, each operating button signalling one digit of an identification number allocated to the hand-set which it is desired to contact. Each actuation of a button causes transmission to a telephone exchange of a multi-frequency signal having characteristics which unambiguously define the number corresponding to the button pressed. For example, the system may utilise tone generators capable of generating four distinctive low frequency tones and four distinct high frequency tones each of the digits 0 to 9 being represented by a multi-frequency signal comprising a particular combination of two frequencies one from the set of higher frequencies and one from the set of lower frequencies. The exchange equipment is arranged to detect the frequencies present as each digit is signalled from the user's hand-set, to deduce from these the corresponding digit and to complete the appropriate connection to the desired number when all of the digits have been recognised.

Telephone hand-sets similar to those employed in the above described communications systems, but with modified press button arrangements, may also be used to allow communication with, for example, a computer where multi-frequency tones generated by depression of a button may have significance other than only to identify digits. The tones may, for example, represent mathematical functions and/or computer control functions.

It will be appreciated that in both of the above described communications systems, tones generated pursuant to depression of each button may be supplied for a relatively short time since it is important that detection of the tones present be effected quickly if reliable recognition of digits is to be obtained.

Aside from the above communications systems, it is also sometimes necessary in telephony to identify signal components of control signals operating between telephone exchanges of a particular type which require forward transmission of two of a group of, say, twelve control tones and revertive transmission of another two of the group of tones, each such tone pair comprising one of a sub-group of six low frequency ones of said tones and one of a sub-group of six high frequency ones of said tones. The identification of these signal components is necessary to establish communication between the two exchanges in order to establish a telephonic link between subscribers to the exchanges. The group of twelve control tones need not necessarily be generated pursuant to depression of telephone hand-set buttons but may be generated internally by the communication exchanges. It will be appreciated that rapid inter-exchange communications are highly desirable and thus, there is again a need in arrangements of this kind for rapid detection of the tones present in the control signals.

In some cases it is desired, in systems like each of those described above, to utilise encoded signals so that the tone signals instead of being transmitted in analogue form are transmitted by use of some coding such as pulse coded modulation. Thus the signal which is received by an exchange may comprise a series of time-spaced pulse groups the groups representing, by some appropriate coding, time-spaced samples of the multi-frequency signal resultant of a combined pair of tones present when, for example, a particular button on the hand-set is depressed. The detection of which tones are present in such a signal can be accomplished for example by re-converting the signal back into analogue form and by use of an analogue filter such as a resonator of some description or it might be accomplished by use of known digital filters able to deal directly with coded signal. In either case, however, the apparatus required is quite sophisticated in its structure and is relatively expensive. It is therefore an object of the invention to provide an improved detection arrangement which can operate directly on encoded information, particularly upon pulse coded modulated information.

According to one aspect of the invention there is provided a method of determining the presence or otherwise of a particular frequency component in a first sequence of pulses or pulse groups representing instantaneous time-spaced values of a periodically varying signal of substantially constant amplitude, the method comprising generating two further sequences of pulses or pulse groups respectively representing instantaneous values, at time spacings corresponding to the time spacing of said values of said periodically varying wave form, of two test signals of said particular frequency, these being of substantially constant amplitude and of substantially square wave form but displaced relative 0 each other by a phase displacement other than 0°and $\pi$, sequentially pairing said pulses or pulse groups of said first sequence with the pulses or pulse groups of one of said further sequences and sequentially pairing the pulses or pulse groups of said first sequence with pulses or pulse groups of the other said further sequence, producing from the paired pulses or pulse groups, signals representing the multiplicands of the corresponding instantaneous values of the periodically varying wave form and the phase displaced test signals, deriving, from these, signals representing the sums of the multiplicands for each paired sequence, and deriving from said signals representing the sums of the multiplicands a signal indicative of the presence of the component.

Said step of deriving a signal indicative of the presence of the component may comprise comparing at least the greater of the absolute values of said sums with a reference value to produce said signal indicative of the presence of the component when the said at least the greater absolute value exceeds said reference value.

Alternatively, the step may comprise comparing the sum of said sums with a reference value to produce said signal indicative of the presence of the component when said sum of the absolute values of said sums exceeds said reference value.

Again, said step may comprise comparing the sum of the squares of the values of said sums with a reference value to produce said signal indicative of the presence of the component when said sum of squares exceeds said reference value.

The invention also provides apparatus for determining the presence or otherwise of a particular frequency component from a first sequence of pulses or pulse groups representing instantaneous time-spaced values of a periodically varying signal of substantially constant amplitude, the apparatus comprising means for generating two further sequences of pulses or pulse groups respectively representing instantaneous values, at time spacing corresponding to the time spacing of said values of said periodically varying wave form, of two test signals of said particular frequency these being of substantially square wave form but displaced relative to each other by a phase displacement other than 0 and $\pi$, means for sequentially pairing said pulses or pulse groups of said first sequence with the pulses or pulse groups of one of said further sequences and means for sequentially pairing the pulses or pulse groups of said first sequence with the pulses or pulse groups of the other said further sequence, means for producing, from the paired pulses or pulse groups, signals representing the multiplicands of the corresponding instantaneous values of the periodically varying wave form and the phase displaced test signals, means for deriving, from these, a signal indicative of the presence of the component.

The said means for deriving a signal indicative of the presence of the component may include aggregating means for deriving, from said signals representing multiplicands, signals representing the sums of the multiplicands for each paired sequence, and comparator means for comparing at least the greater of the absolute values of these sums with a reference value to produce said signal indicative of the presence of the component when the said at least the greater absolute value exceeds said reference value. Alternatively, said means for deriving may comprise summation means for deriving from said signals representing the multiplicands, signals representing the sums of the multiplicands for each paired sequence, summation means producing an output signal representing the sum of said signals representing the sums of the multiplicands, and comparator means for comparing this output signal with a reference value to produce, when said output signal exceeds said reference value, said signal indicative of the presence of the component. Again, said means for deriving may comprise multiplier means for generating from said signals representing multiplicands, signals representing the sums of the multiplicands for each paired sequence, summation means for producing from these an output signal representing the sum of the squares of said sums, and means for comparing said output signal with a reference value to produce said signal indicative of the presence of the component when said output signal exceeds said reference value.

The method and apparatus may, of course, be applied to the detection of various frequency components simultaneously present by using a series of test signals of the desired frequencies and by carrying out the above method for each component.

The said reference value may be a fixed stored value, or in cases where various frequencies are to be detected, and it is known that only a certain number of components will be present, it could be derived indirectly from comparison of at least the greater of the absolute values of said sums or the sum of the absolute values of the sums or the sum of squares of the sums for various components.

One embodiment of the invention is described in detail with reference to the accompanying drawings in which.

Figures 1, 2:
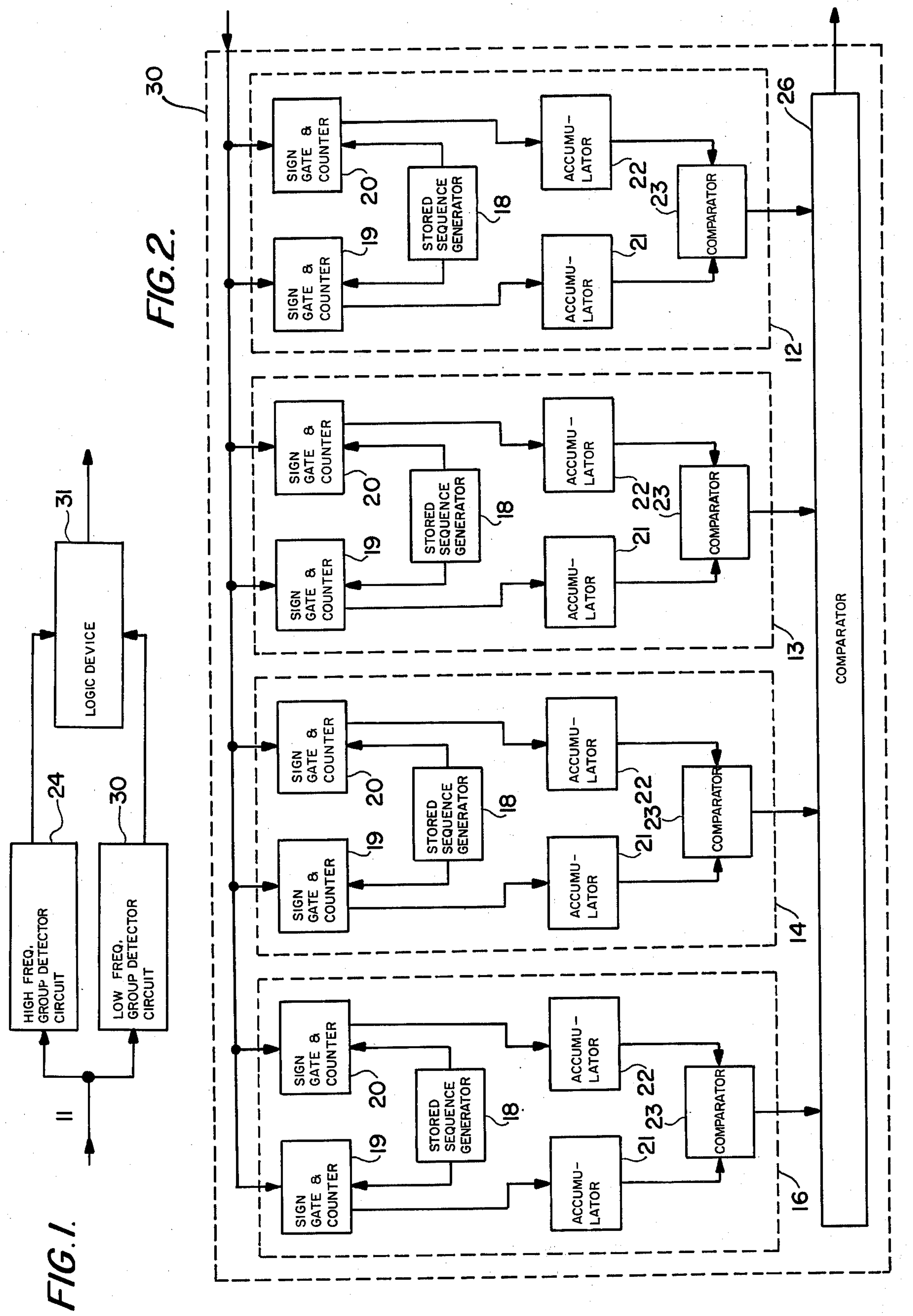
FIG. 1 is a block diagram of an apparatus constructed in accordance with the invention.
FIG. 2 is a block diagram of part of this apparatus.

The apparatus is for the purpose of detecting the presence of any one of four possibly present signals in a pulse code modulated incoming signal on line 11. The apparatus is for use in a telephone system of the kind mentioned previously. It operates to determine which two of a total number of eight possible signals are present on line 11. One of the signals is from a group of four possible signals of different low frequencies and the other is from a group of four possible signals of differing high frequencies. From identifications of the component signals present, an identification of a digit which had been selected by a telephone user can be made.

The incoming signal on line 11 is passed to two circuit sections 30 and 24; circuit 30 operates to determine which signal of the lower frequency group is present, whilst circuit 24 operates to determine which frequency of the higher frequency group is present.

Circuits 30 and 24 are identical in operation and the operation of circuit 30 only is described in detail. Circuit 30 includes the four discriminating devices 12, 13, 14 and 16 indicated in FIG. 2. These are identical in construction and a description of one device 16 is only given. This comprises a stored sequence device 18 which has stored therein a sequence of numbers the sequence representing a square wave test signal of a particular frequency to be detected by that device. The numbers might represent encoded successive instantaneous values of the square wave sampled at intervals corresponding to the sampling rate of the digitally encoded samples comprising the signal on line 11. However, it is preferred that such values be represented in a "shorthand" manner as by a set of numbers representing the number of successive positive samples and then the number of negative samples for each cycle of the wave form. Thus, if device 16 is to detect a signal component at 697 hertz and the samples of signal on line 11 are at intervals of 1/8,000 second, the sequence stored in device 18 might be represented by the sequence 6656665666 . . . this representing six unit positive-value samples to be followed by six unit negative value samples then five unit positive value samples and six negative samples and so on. This represents a square wave test signal of unit amplitude and of frequency 697 hertz. The stored sequence is passed to a first sign-gate and pulse counter 19 which operates, when a group of signals representing a particular sample on line 11 is passed thereto, to produce an output representing that sample-multplied by a number representing a corresponding value of the test signal, the signal groups on line 11 being sequentially multiplied in this way by the corresponding values of the test signal. By the preferred manner of representing the test signal, the sign-gate can be arranged merely to alter the signs of the incoming signals on line 11 in accordance with the stored numbered sequence.

The multiplications may be performed by utilizing all of the information of each incoming pulse or pulse group, but in many instances it will be sufficiently accurate to merely use an approximation of the pulse or pulse group. For example, a two bit or 3 bit approximation may suffice. This might be accomplished by inserting a bit limiting circuit between line 11 and counter 19 and arranged to read the most significant bits and pass them to the counter. In other instances it might be sufficient to merely read whether each incoming sample was positive or negative.

A second sign-gate and pulse counter 20 is also provided. This operates on signals on line 11 in the same manner as does the sign-gate and pulse counter 19 except that it is arranged so that the sequence of numbers in store 18 is multiplied with a sequence of samples on line 11 in a manner such that the multiplications correspond to multiplication with the test wave form one quarter of a cycle out of phase with the sequence effected by sign-gate and pulse counter 19. This might be effected, for example, by arranging that the first switch over between positive and negative values occurs at a point corresponding as closely as practicable to half the first sequence number in store 18, and that subsequent switchovers are governed by the remaining sequence numbers in store 18. Thus if, as in the example given, sign-gate and pulse counter 19 are controlled by the sequence 6656665666 . . . , then sign-gate and pulse counter 20 are controlled by the sequence 3656665666 . . . .

The multiplied values for multiplications derived from counters 19 and 20 are accumulated in respective accumulators 21, 22 and at the end of a predetermined counting period the maximum of the absolute values of these is determined by a comparator device 23. Each discriminating device 12, 13, 14 and 16 includes accumulators 21, 22 and the maximum values determined in these are passed to associated comparators 23. The outputs of all comparators 23 are passed to a comparator 26 which determines, from the maximum absolute values passed to it, which of the absolute values is the greatest, this corresponding to the frequency which is present on the line 11. Comparator 26 produces an output indicative of the detected component frequency. Simultaneously, the higher frequency component present is detected by device 24 and this produces an output indicative of the detected higher frequency component. Outputs from devices 30, 24 are passed to a logic device 31 which then determines the digit number corresponding to the detected component pair and passes it to equipment for operating a selector mechanism in accordance with the determined digit number so that, when all of the digit numbers selected by the telephone user have been determined, an appropriate connection can be made.

The selectivity of the apparatus, ie., its ability to reject frequency components differing from the test frequencies by various amounts, may be varied by changing the number of pulses processed. Increasing this number of pulses will increase the selectivity. Means may be incorporated into the apparatus for selectively varying the number of pulses processed to enable the selectivity to be varied at will.

It will be seen that the described apparatus provides a very convenient method of determining the frequencies in a pulse code modulated or other coded signal, without the need to decode the signal into analogue form. Of course, many variations may be made to the described construction.

Particularly, in the device 30, the comparator 23 for each frequency component in the first group could be eliminated and a single comparator 26 used to compute only which of the summed values from the accumulators 21, 22, is the greatest. A similar economy can be effected in the circuit 24. This is because it is known that only one signal in each group will be present. However, in cases where more than one component may be present it would be necessary for the arrangement to include a separate comparison operation on the values determined for each test signal.

In the described apparatus, the two square wave test signals for each component are represented by a single stored decimal number sequence in device 18. This is not, however, essential as the two signals could be represented by a binary sequence so that unit positive-value samples were stored as binary 1's and unit negative-value samples were stored as binary 0's. Thus, the previously mentioned 697 Hertz wave form could, for example, be represented as a sequence 111111000000111111000000111111000000111111-000000111111000000 . . . in device 18.

Again, the use of a single stored sequence and switch-over arrangement to generate the pair of one quarter cycle phase displaced test signals for each test frequency is not essential. Thus, store 18 may contain two completely independent sequences, for example 6656665 . . . 3656665 . . . with one of the sequences being passed directly to sign gate 19 and the other being passed directly to sign gate 20 thereby eliminating the need for the switch-over mechanism necessary with a single stored sequence.

Figure 4:
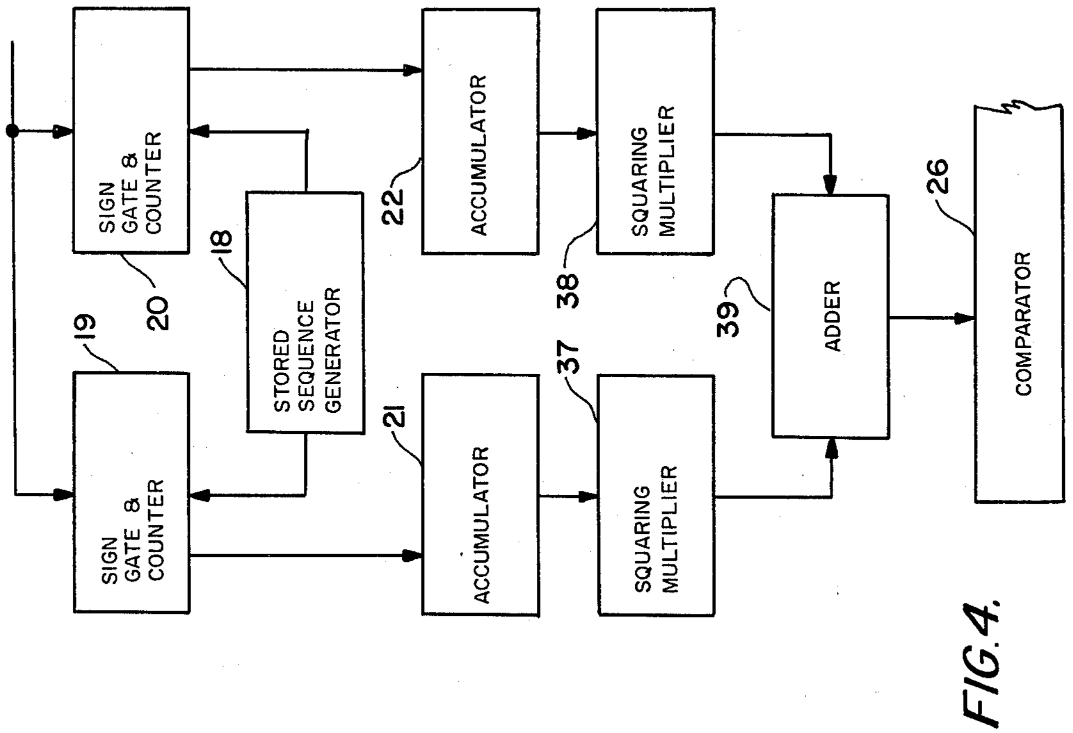
FIG. 4 is a block diagram showing another modification of the apparatus of FIG. 1.
Figure 3:
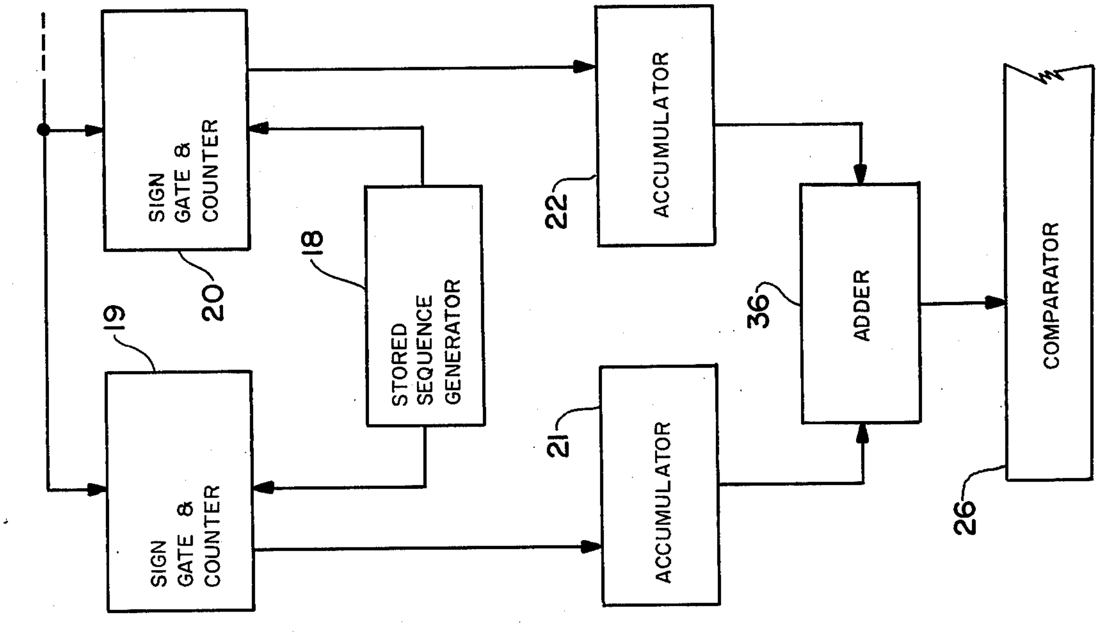
FIG. 3 is a block diagram showing a modification of the apparatus of FIG. 2.

Furthermore, the described means for processing the multiplicands of incoming and test signals to provide detection can be varied. For example, FIG. 3 shows a modified apparatus in which the comparators 23 of FIG. 2 are replaced by additive circuits 36 to add the value or modulus of each accumulated sum provided by the associated accumulators 21, 22 and this resultant sum passed to comparator 26. FIG. 4 illustrates another alternative arrangement in which the accumulated sums in each pair of accumulators 21, 22 are passed to separate multipliers 37, 38 which operate to square these sums. Additive circuits 39 each receive the squared sum outputs of an associated pair of multipliers 37, 38 and add these. The added squared sums are then passed to comparator 26. In each of these modifications, comparator 26 operates in the same way as in the first described embodiment, providing an output indicative of the presence of a signal component when the output from the corresponding additive circuit 36 or 39 exceeds a reference value which is either fixed or established by comparison with outputs of others of the additive circuits 36 or 39. Thus, in the embodiment of FIG. 2, the comparator (or comparators) 23 together with the comparator 26; in FIG. 3, the adder (or adders) 36 and comparator 26; and in FIG. 4, the squaring multipliers 37, 38, the adder (or adders) 39 and the comparator 26 constitute means to indicate component presence, i.e., these elements constitute a component indicator means.

Although the described arrangement is suitable for a particular use in a particular form of telephone switching network it could, of course, be used for other purposes. Thus, it may be used for inter-exchange signalling using control tones different from and generated in a different manner from those used in the apparatus described above and which are subscriber-to-exchange signals and which are generated by the subscriber. Also the use of the method and apparatus need not be limited to telephone systems but may be extended to quite general recognition of frequencies.

Many modifications and variations may be made to the described construction without departing from the spirit and scope of the invention as defined in the appended claims.

I claim:

1. A method of determining whether a particular frequency component is present in a first sequence of pulse code modulated signals, the signals representing instantaneous time spaced values of a periodically varying signal of substantially constant amplitude, the method comprising;

generating from a stored sequence generator second and third sequences of digitally encoded signals respectively representing the instantaneous values, at time spacings corresponding to the time spacing of said values of said periodically varying signal, of separate ones of two test signals of said particular frequency, these test signals being of substantially constant amplitude and of substantially square-wave form but displaced relative to each other by a phase displacement other than 0 and $\pi$;

deriving two further sequences of signals representing the multiplicands of the corresponding instantaneous values of the periodically varying signal and the respective phase displaced test signals;

deriving, from these two further sequences of signals, two signals, one representing the sums of the multiplicands of each respective said further sequence of signals; and deriving, from said signals representing the sums of multiplicands, an indication signal which, when said component is present, is indicative of such presence.

2. A method as claimed in claim 1, including:

comparing at least the greater of the absolute values of said sums with a reference value; and conditioning said indication signal to be indicative of the presence of said component when the said at least the greater absolute value exceeds said reference value.

3. A method as claimed in claim 1, including:

summing absolute values of said sums;

comparing such sum of sums with a reference value; and conditioning said indication signal to be indicative of the presence of said component when said sum of sums exceeds said reference valve.

4. A method as claimed in claim 1, including:

squaring each said sum;

summing the resultant squared sums;

comparing such sum of the squared sums with a reference value; and conditioning said indication signal to be indicative of the presence of said component when said sum of the squares exceeds said reference value.

5. A method as claimed in claim 1, wherein said phase displacement is substantially $\pi/2$.

6. Apparatus for determining whether a particular frequency component is present in a first sequence of pulse code modulated signals representing instantaneous time spaced values of a periodically varing signal of substantially constant amplitude, the apparatus comprising:

a stored sequence generator for generating second and third sequences of digitally encoded signals respectively representing the instantaneous values, at time spacings corresponding to the time spacing of said values of said periodically varying signal, of separate ones of two test signals of said particular frequency, these test signals being of substantially square wave form but displaced relative to each other by a phase displacement other than 0 and $\pi$;

two sign gates coupled to receive said first sequence of signals and respective separate ones of said second and third sequences of signals and operable to produce two further sequences of digitally encoded signals representing multiplicands of corresponding instantaneous values of the periodically varying signal and the respective phase displaced test signals;

first and second accumulators coupled to receive respective separate ones of said further sequences of signals and to separately accumulate these; and component indicator means receiving the accumulated said further sequences of signals and deriving from these an indication signal which when said component is present is indicative of such presence.

7. Apparatus as claimed in claim 6, wherein said component indicator means includes a comparator for comparing at least the greater of the absolute values of said accumulated said further sequences of signals with a reference value to condition said indication signal to be indicative of the presence of said component when the said at least the greater absolute value exceeds said reference value.

8. Apparatus as claimed in claim 6, wherein said component indicator means includes;

an adder coupled to both said first and second accumulators to receive said accumulated said further sequences of signals and to produce an output signal representing the sum of absolute values of said accumulated said further sequences; and comparator means coupled to said adder to receive said output signal and to compare it with a reference signal to condition said indication signal to indicate the presence of said component when said output signal exceeds said reference signal.

9. Apparatus as claimed in claim 6, wherein said component indicator means includes;

two squaring multipliers, one coupled to each said accumulator, and these being operable to receive respective said accumulated said further sequences of signals and to produce respective signals representing the squares of the sums of the respective said accumulated said further sequences of signals;

an adder coupled to said squaring multipliers to receive said signals representing the squares and to produce an output signal representing the sum of the squares; and comparator means coupled to said adder to receive said output signal and operable to compare with a reference value to condition said indication signal to be indicative of the presence of said component when said output signal exceeds said reference value.

10. Apparatus for determining which one of a number of particular components of different predetermined frequencies within a given frequency range is present in a first sequence of pulse code modulated signals representing instantaneous time spaced values of a periodically varying signal of substantially constant amplitude, the apparatus comprising:

a plurality of stored sequence generators operable to generate, for each said frequency component, second and third further sequences of digitally encoded signals respectively representing instantaneous values, at time spacings corresponding to the time spacing of said values of said periodically varying signal, of two test signals of the corresponding predetermined frequency, each such two test signals being of substantially square wave form but displaced relative to each other by a phase displacement other than 0 and $\pi$;

a plurality of pairs of sign gates, each said pair being coupled to receive said first sequence of signals and to separately receive, one to each one of said pair, the second and third sequences of signals corresponding to a respective one of said predetermined frequencies, and to produce, for each pair, two further sequences of signals representing the multiplicands of the corresponding instantaneous values of the periodically varying wave form and the respective phase displaced test signals;

a plurality of accumulators, one accumulator connected to receive the said further sequence of signals from a separate one of each of said sign gates, and each said accumulator operating to accumulate signals of the further sequence received thereby; and component indicator means coupled to receive the accumulated said further sequences and operable to derive from these an indication signal which indicates which of said components is present, in said first sequence of signals.

11. Apparatus as claimed in claim 10, wherein said component indicator means includes:

a plurality of first comparators, each first comparator being coupled to the two accumulator means which are associated with a separate one of said pairs of sign gates and operating to receive the accumulated said further sequences of signals from these accumulators and to compare these and produce an encoded output signal representative of at least the absolute value of that of the accumulated said further sequences of signals applied thereto having the greater absolute value; and a second comparator coupled to all said first comparators to receive said output signals and operable to condition said indication signal to be indicative of the presence of a said component by identifying that one of said output signals which is of the greatest absolute value.

12. Apparatus as claimed in claim 10, wherein said component indicator means includes:

a plurality of adders, each adder being coupled to the accumulator associated with a separate one of said pairs of said sign gates to receive the accumulated said further sequences of signals from these accumulators and being operable to produce a digitally encoded output signal representing the sum of the absolute values of the accumulated said further sequences of signals received thereby; and a comparator which is coupled to each said adder to receive all said output signals and operable to condition said indication signal to be indicative of the presence of a said component by identifying whichever of said output signals wich is greatest.

13. Apparatus as claimed in claim 10, wherein said component indicator means includes:

a plurality of squaring multipliers, a separate one being coupled to each said accumulator to receive the accumulated said further sequence of signals therefrom and being operable to generate a signal representing the square of the respective said accumulated said further sequence of signals received thereby;

a plurality of adders, each adder being coupled to the squaring multipliers associated with a separate one of said pairs of sign gates to receive the said signals representing the squares of the accumulated said further sequences of signals from these accumulators and being operable to add these to produce an output signal representing the sum of the squares of said accumulated said further sequences of signals applied thereto; and a comparator coupled to all said adders to receive the said output signals therefrom and operable to condition the said indication signal to be indicative of the presence of a said component by identifying that one of said output signals which is greatest.

14. A method of determining which of a number of particular components of different predetermined frequencies is present in a first sequence of pulse code modulated signals representing instantaneous time spaced values of a periodically varying signal of substantially constant amplitude, the method comprising:

generating from a plurality of stored sequence generators and for each said component, second and third sequences of pulses respectively representing the instantaneous values, at time spacings corresponding to the time spacing of said values of said periodically varying wave form, of two test signals of corresponding predetermined frequency, each such two test signals being of substantially constant amplitude and of substantially square-wave form but displaced relative to each other by a phase displacement other than 0 $\pi$;

generating for each said two test signals two further sequences of signals representing the multiplicands of the corresponding instantaneous values of the periodically varying signal and the respective test signals;

separately accumulating said further sequences of signals corresponding to each said test signal; and deriving from the accumulated said further sequences of signals an indication signal the state of which is indicative of which of said components is present in said first sequence of signals.

15. A method as claimed in claim 14, wherein said indication signal is derived by:

comparing, for each said component, the absolute values of the two corresponding accumulated said further sequences of signals to produce an output signal which is indicative of the magnitude of the greater of these absolute values; and then comparing the output signals for each said component to condition said indication signal to indicate the component which is present by identifying that of the output signals which is greatest.

16. A method as claimed in claim 14, wherein said indication signal is derived by:

adding, for each said component, the absolute values of the two corresponding accumulated said further sequences of signals and generating a corresponding output signal representing at least the absolute values of these added accumulated sequences; and then comparing the absolute values of said output signals corresponding to all of the said components and conditioning said indication signal to indicate the component present in accordance with that of said output signals which has the greatest absolute value.

17. A method as claimed in claim 14, wherein said indication signal is derived by;

first deriving, for the two accumulated said further sequences of signals corresponding to each frequency component, signals representing the squares of such accumulated further sequence;

deriving, for each component an output signal representing the sum of the two corresponding signals representing squares; and conditioning said indication signal to indicate the component which is present by identifying that one of said output signals which is of greatest absolute value.

* * * * *